United States Patent [19]

Cottingham et al.

[11] 4,324,504
[45] Apr. 13, 1982

[54] METHOD OF SEALING BRIDGE DECK JOINTS

[75] Inventors: Richard L. Cottingham, Piltdown; David J. Thorpe, Eastbourne; Eric Bickerstaff, Seaford, all of England

[73] Assignee: Thormack Sealants Limited, Uckfield, England

[21] Appl. No.: 120,849

[22] Filed: Feb. 12, 1980

Related U.S. Application Data

[63] Continuation of Ser. No. 925,156, Jul. 17, 1978.

[30] Foreign Application Priority Data

Jul. 22, 1977 [GB] United Kingdom ............... 30990/77
Oct. 12, 1977 [GB] United Kingdom ............... 42544/77
Nov. 30, 1977 [GB] United Kingdom ............... 49968/77

[51] Int. Cl.$^3$ ............................................. E01C 11/02
[52] U.S. Cl. ........................................ 404/74; 404/47; 52/396
[58] Field of Search ................... 404/47, 74, 69, 87, 404/72; 52/396; 14/1, 16.5

[56] References Cited

U.S. PATENT DOCUMENTS

| | | | |
|---|---|---|---|
| 1,401,974 | 1/1922 | Fischer | 404/74 X |
| 1,891,897 | 12/1932 | Fischer | 404/87 |
| 1,926,516 | 9/1933 | Edge | 404/74 |
| 2,103,648 | 12/1937 | Snelling | 404/74 |
| 2,104,059 | 1/1938 | Snelling | 404/47 X |
| 2,208,082 | 7/1940 | Randall | 404/74 |
| 2,221,431 | 11/1940 | Omansky | 404/47 |
| 2,339,556 | 1/1944 | Greenup | 404/74 |
| 2,348,188 | 5/1944 | Boyer | 404/69 X |
| 2,524,395 | 10/1950 | McConnaughay | 404/47 |
| 3,223,005 | 12/1965 | Carlson | 404/47 |
| 3,503,311 | 3/1970 | Gagle | 404/74 |

*Primary Examiner*—Nile C. Byers, Jr.
*Attorney, Agent, or Firm*—Fleit & Jacobson

[57] ABSTRACT

A method of sealing bridge deck joints on a highway in which the deck members have the road surfacing material removed therefrom and a flexible composition of chips of aggregate in a rubberized binder, such as bitumen, pitch, pitch-tar or tar is inserted in the removed area as a resilient sealing material.

8 Claims, 1 Drawing Figure

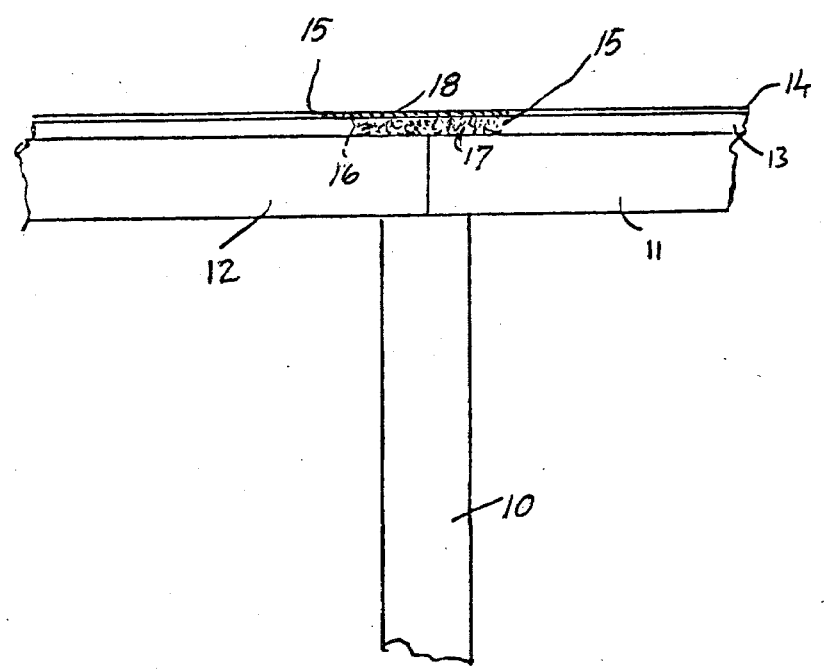

METHOD OF SEALING BRIDGE DECK JOINTS

This is a continuation application of U.S. patent application Ser. No. 925,156, filed July, 17, 1978.

The present invention relates to a method of sealing bridge deck joints.

It is current engineering practise to construct bridges, in particular, motorway bridges, of decks of concrete supported on pillars, the supports usually only occurring at the junction of two deck members. The deck members are then covered usually with hot rolled asphalt including a base layer and a covering wearing layer which extend continuously over the bridge so that the junction between the deck members is not visible.

Particularly in motorway use, in which heavy vehicles continuously pass over the bridges, cracks tend to occur over the joints in the concrete deck members.

In order to overcome this problem, it has been conventional to cut a channel in the hot rolled asphalt surface about 30 cm wide at the location of the joint between the deck members and to apply on to the concrete deck members two strips of epoxy mortar known as "epoxy nosing", these being about ten to twelve cms wide and having a gap of two to three cms therebetween. Into this gap there is applied a continuous strip of plastic or rubbery sealing material. This is generally satisfactory but does give rise to considerable problems. Since the vehicle wheels usually pass over exactly the same spot, tracking occurs and potholes appear on either side of the very hard epoxy nosing. Thus, although the problem at the juncture of the deck members is reduced, the asphalt nonetheless is damaged on either side thereof. Furthermore, since the epoxy nosing is very hard, and since the blocks imparted are not absorbed, there is a tendency for the concrete decking and pillars to crack.

It is now proposed, according to the present invention, to provide a method of sealing bridge deck joints wherein a flexible composition of chips of aggregate in a rubberized binder is placed thereon at the junction between two deck members.

Advantageously, the binder is compatible with the road surfacing material. Suitable binders include bitumen, pitch, pitch-tar, and tar.

The flexible composition may be applied at the time of building of the bridge, but more normally it is applied subsequent thereto. Thus, it is advantageous to remove the existing hot rolled asphalt either completely, or to a depth of approximately 10 centimeters, and for a width of 50 cm to 1 meter across the full width of the bridge.

The flexible composition preferably consists of a hard aggregate, such as twenty millimeter granite chips, in a matrix of rubberized bitumen. If heavy traffic loads are to be supported, a higher proportion of stones is preferred. Thus, in general, the flexible composition should have between 40% aggregate and 70% aggregate of the total volume, 50% aggregate being suitable for most roads and 60% aggregate for heavy duty motorway use.

The rubberized bitumen is preferably a hot poured bitumen composition in which a high proportion of rubber is necessary to give the desired flexibility.

In use, the area to be filled is prepared by cutting out and cleaning, e.g. by using a thermic lance. The advantage of using a thermic lance is that it ensures the removal of loose particles and that the material surrounding the cut-out portion is hot. Thereafter, heated stones and hot matrix material are then mixed in situ by a method suitable to ensure a high stone content. Alternatively, premixed hot rubberized aggregate and binder can be produced separately, e.g. in a lorry similar to a cement carrying lorry provided with a heater, and the premixed material is inserted while the road surfacing material is still hot. Since the road surface material on each side of the cut-out portion is still hot, in either event, this ensures a better bond with the flexible composition which is inserted according to the invention. Using a vibrating poker or plate has been found useful for this purpose.

In a further arrangement according to the invention, premoulded blocks of chips of aggregate in a matrix of rubberized binder can be made and these can be inserted into the previously cut out area which has been cut out as before, the insertion taking place while the road surfacing material is still hot. This has the advantage that the joint will cool off much more quickly and will be ready for use much earlier.

Finally, the surface may be tamped, with the addition of smaller surface stones, if necessary, so as to bring the profile up with the profile of the road, while maintaining a high stone content in the surface layer.

It has been found that, by utilizing the method of the present invention, an extremely flexible structure is achieved, which is capable of withstanding very heavy loading and reducing the tendency for cracks to form in the surface layer or in the bridge structure, that is in the concrete decking or pillars.

Three suitable compositions for the rubberized bitumen matrix are given in the Table below:

|  | 1 | 2 | 3 |
|---|---|---|---|
| Bitumen | 57.1% | 54.1% | 66.7% |
| Tire crumb rubber | 14.3% | 13.5% | 16.6 |
| Fine sand | 28.6% | 27.0% | — |
| Limestone powder | — | 5.4% | 16.7% |

In the accompanying drawing, there is shown schematically a cross-section through a bridge structure, which comprises a pillar 10 supporting two bridge deck members 11 and 12. Superimposed on the bridge members is the conventional hot rolled asphalt including a lower base layer 13 and an upper wearing layer 14.

According to the present invention, the asphalt is cut back, to provide a trough across the bridge which has been indicated in chain-dotted lines by the reference numeral 15, and final preparation carried out using a thermic lance. Within this base there is inserted, while the bridge is still warm and dry from the thermic lance, a mixture of rubberized bitumen, of the type indicated previously, and for example one of the compositions shown in the Table above, this being indicated by the reference numeral 16. Granite chips, for example of twenty millimeter mesh size, applied in layers, indicated by the reference numeral 17 are inserted throughout the trough and are bound in place by the hot rubberized bitumen 16. On the final surface, smaller stones are inserted. As indicated, the compaction of the lower stones can be caused by using a vibrating poker or plate and the top surface can be tamped with the addition of the smaller surface stones 18.

We claim:

1. A method of sealing a bridge deck joint in which the bridge deck members comprise a concrete base and a road surfacing material, said method comprising the steps of providing a channel in the road surfacing material at the location of the joint, the channel extending through the full depth of the road surfacing material across the width of the bridge, and filling the channel substantially completely with a flexible composition of chips of stone aggregate in a rubberized binder, said binder consisting mainly of bitumen, pitch, pitch-tar or tar together with rubber wherein the chips occupy 40 to 70% by volume of the composition, and said chips of stone aggregate being all of substantially the same mesh size.

2. A method as claimed in claim 1, wherein said chips are of a 20 millimeter mesh size.

3. A method as claimed in claim 1, and further comprising the step of cutting out the road surfacing material in the area to be filled and cleaning with a thermic lance and inserting the flexible composition of chips and aggregate and binder into the removed area while the latter is hot.

4. A method as claimed in claim 1 and further comprising the steps of cutting out the road surfacing material and cleaning with the thermic lance in the area to be filled, premixing hot rubberized aggregate and binder and inserting the premixed hot rubberized aggregate and binder into the removed area while the surfacing material is still hot.

5. A method as claimed in claim 1, and further comprising the steps of cleaning the channel provided in the road surfacing material with a thermic lance and introducing heated aggregate and binder into the channel while the latter is still hot.

6. A method as claimed in claim 1, and further comprising the steps of cleaning out the channel provided in the road surfacing material with a thermic lance and inserting a premixed hot rubberized aggregate binder into the channel while the road surfacing material is still hot.

7. A method as claimed in claim 1, and further comprising the steps of cleaning out the channel formed in the road surfacing material using a thermic lance and inserting blocks of chips of aggregate in a matrix of rubberized binder.

8. A method as claimed in claim 1, and further comprising the step of tamping the surface with the addition of small surface stones to bring the profile of the joint up to the profile of the road surface while maintaining high stone content in the surface layer.

* * * * *